Patented June 6, 1939

2,160,931

UNITED STATES PATENT OFFICE 2,160,931

CO-POLYMERIZATION PRODUCTS

Ralph M. Wiley, Midland, Mich., assignor to The Dow Chemical Company, Midland, Mich., a corporation of Michigan No Drawing. Application July 1, 1936, Serial No. 88,403

15 Claims. (Cl. 260—80)

This invention concerns certain new plastic and resinous products prepared by the co-polymerization of a vinyl ester with a compound selected from the group consisting of 1,1-dichloroethylene and 1-chloro-1-bromo-ethylene.

The preparation of resins by the polymerization of the vinyl esters under suitable conditions of temperature and pressure is old. The products obtained from such processes are generally soluble in common organic solvents, e. g., benzene, acetone, etc., and for this reason are unsuited for the preparation of plastic articles, filaments, and the like, when such fabricated articles may be exposed to the action of said solvents. Most vinyl halide type resins possess the added disadvantage of decomposing at temperatures of about 180°–200° C., hence are difficult to form into molded articles by the methods commonly used for other types of resins.

It is among the objects of this invention to prepare resins which are less affected by common organic solvents than the resins containing a vinyl ester heretofore known, and also which may be molded more readily.

I have discovered that the co-polymerization of 1,1-dichloroethylene or 1-chloro-1-bromo-ethylene, and a vinyl ester, in the proper proportions and in the presence of suitable catalysts, results in the formation of valuable resin-like masses, having the aforesaid desired advantages. In the preparation of my new resin products the desired proportions of the unsymmetrical dihalo compound and vinyl ester are mixed together, a catalyst added thereto, and the reaction carried out by maintaining the reaction mixture at suitable temperatures until the desired degree of co-polymerization has been obtained. Any unpolymerized material may then be recovered from the reacted mixture, e. g., by distillation, to obtain as a residue the crude co-polymer. This product, if desired, may be thereafter purified, as by washing, bleaching, etc. The co-polymer may then be molded, rolled, extruded, or otherwise fabricated as desired.

My new resins may be obtained in a variety of physical forms, e. g., as a powder, porous solid, or hard, bone-like material, depending upon the degree of completeness to which the reaction process is carried. Regardless of the physical form in which they are obtained, I have found that my new products possess relatively low softening points and exhibit desirable plasticity at their molding temperatures.

I have further discovered that my new co-polymers may be converted by application of pressure thereto, and at temperatures between 80° and 170° C., into translucent or nearly transparent resinous bodies. By incorporating a plasticizing agent in the co-polymer prior to molding, the preparation of the resinous bodies may be carried out at even lower temperatures. Suitable plasticizers are chlorinated diphenyloxide, butyl phthalate, naphthalene, chloro-naphthalene, triphenyl phosphate, tricresyl phosphate, pentachloroethane, or hexachloroethane.

Such resinous bodies are normally obtained in substantially colorless form, but may be dyed to any desired color or shade by incorporating pigments or dyes therewith. While the above resinous bodies have a high tensile strength immediately after preparation, it has been determined that the act of drawing, pressing, or otherwise stretching the same increases said tensile strength and toughness and further decreases their susceptibility to solvent action. In addition to the characteristics just mentioned, I have observed that these compositions are especially resistant to chemical attack by acids, bases, and oxidizing agents.

I have prepared resinous compositions of the present type, containing up to 80 per cent by weight of a vinyl ester co-polymerized therein, but preferably limit the co-polymerized vinyl ester content therein to from about 5 to about 30 per cent by weight to form a product displaying all of the desirable characteristics above described. In preparing such preferred co-polymers the reaction is carried out with mixtures or solutions containing from about 5 to 100 parts by weight of a vinyl ester to 100 parts of 1,1-dichloro- or 1-chloro-1-bromo- ethylene. The polymerization product obtained will not always coincide in percentage composition with the mixture reacted upon, but will generally be found to have a co-polymerized vinyl ester content within the limits specified above. The vinyl ester is dissolved in the dihalo-ethylene and the resulting solution co-polymerized in the presence of catalytic amounts, i. e. not in excess of about 3.0 per cent by weight, of a catalytic mixture comprising at least one oxidizing agent, such as oxygen, ozone, benzoyl peroxide, acetyl chloride, acetic anhydride, per-acetic acid, etc., and at least one metal-containing catalyst such as tetra-ethyl lead, nickel carbonyl, diethyl zinc, diethyl mercury, etc. The co-polymerization is generally carried out in a closed vessel at temperatures ranging between 15° and 60° C. and preferably between 25° and 40° C. The reaction mixture is maintained at this temperature and usually under the vapor pressure of the reactants at such temperature, until the desired degree of reaction is obtained. The time required for reaction is dependent upon the proportions of reactants, the catalyst employed, the temperature of reaction, and the degree of co-polymerization desired, but does not generally exceed 200 hours, and may be as low as 5 hours. Unpolymerized material is thereafter separated from the reacted mixture, e. g., by warming the same to approximately 110 C., or by fractional solvent extraction, etc., and may be utilized in further runs. The co-polymers are recovered as a residue from the above separation step, and if desired may be purified, as by washing with a dilute aqueous or organic solvent solution of chlorine, nitric acid, etc., although this is not necessary. Such a step, if carried out, serves not only as a bleach but also removes to a large extent residual catalyst bodies present in the co-polymer, and in so doing increases the resistance of the co-polymer to thermal decomposition. After treating with such an acid wash the product is re-washed with a solvent such as hot water or alcohol to remove acid residues therefrom, and after drying is ready for fabrication.

If desired, heat stabilizing agents such as methyl stearate, dichloro-methyl stearate, calcium stearate, etc., may be incorporated into the co-polymeric product, either by including such material in the original reaction mixture prior to the step of polymerization or by adding the same to the pre-formed co-polymer. The addition of such materials greatly increases the resistance of the final product to thermal decomposition.

The physical form of the product obtained is dependent upon the degree of completeness of the reaction. Thus, if the heating step of the process described above is stopped when only about 20 per cent of the reactants have been polymerized, the product is obtained as a white powder. If polymerization is interrupted when from 40-50 per cent reaction has occurred, the resin is isolated as a highly porous mass. A hard bone-like product is obtained when the polymerization is carried out substantially to completion. Products having the highly porous or bone-like structures may, if desired, be broken up or pulverized before molding.

Molded resins may be prepared from any of the above forms, and the molding process conveniently carried out at approximately the softening temperature of the resin concerned, generally between 80° and 170° C. The molding temperature chosen is preferably below the decomposition temperature of the particular resin concerned, the latter temperature being largely dependent upon the proportion of vinyl ester present in the original reaction mixture, the amount of residual catalyst dispersed in the resin product, and the presence or absence of heat-stabilizing agents. In the molding operation the co-polymer, preferably in finely divided form, is heated in a die of usual type to the molding temperature, i. e., the softening temperature of the resin as specified above, after which a pressure between about 100 and 2000 pounds per square inch is applied momentarily, the die cooled, and the molded resin product promptly removed.

Filaments are produced by extruding the co-polymerized material through small orifices in a plate at the softening temperature of the resin and preferably between 110° and 150° C., into a cooling medium, and applying tension to the cooled extruded material so as to draw the same into the desired filaments. The step of extruding and drawing is essentially a stretching operation, and results in a filament of maximum toughness and high tensile strength. Such filaments may be spun into threads from which cloth and other fabrics may be woven. The cloth or other fabric product thereby obtained retains the desirable characteristics of the resin from which it is prepared, e. g., it is substantially unaffected by organic solvents, most acids, bases, and strong oxidizing agents, etc.

The following examples illustrate certain ways in which the principle of my invention has been applied, but are not to be construed as limiting the invention:

*Example 1*

5.2 grams of vinyl chloride, 20.8 grams of 1,1-dichloroethylene, and a catalyst mixture comprising 0.1 gram of tetra-ethyl lead, 0.1 gram of nickel carbonyl, and 0.12 gram of benzoyl peroxide, were mixed together at a temperature of $-20°$ C. to form a clear solution, which was thereafter charged into a small, tightly stoppered vessel adapted to stand the pressure of reaction. The temperature was gradually raised to and maintained at about 40° C. for a period of 120 hours, at the vapor pressure of the reactants, after which the reacted mixture was removed from the vessel and warmed to 110 degrees C., to recover 0.4 gram of unpolymerized material. 25.8 grams of co-polymer was thereby obtained as a residue in the form of a hard, bone-like resinous material, molding freely at 135° to 150° C. This material was found to be substantially unaffected at room temperature by contact with organic solvents, and upon fabrication gave a foil having a tensile strength in excess of 20,000 pounds per square inch.

*Example 2*

A mixture of 8.7 grams of vinyl chloride, 20.3 grams of 1,1-dichloroethylene, 0.1 gram of tetra-ethyl lead, 0.1 gram of nickel carbonyl, 0.12 gram of benzoyl peroxide, and 0.1 gram of chloroacetyl chloride was allowed to stand in a closed glass container at a temperature of approximately 30° C. and at the vapor pressure of the reactants for 120 hours. 19.6 grams of unpolymerized reactants was then distilled from the mixture, leaving a residue of 9.4 grams of the desired co-polymer as a white powder. This product was washed successively with an excess of hot aqueous 20 per cent nitric acid solution, then with hot water, and dried. The powder so obtained was found to have a softening temperature of 125° C. to 140° C., and to be substantially unaffected by contact with organic solvents at room temperature. Drawn plastic products prepared from this material were found to have extreme toughness and a tensile strength in excess of 20,000 pounds per square inch.

*Example 3*

A mixture of 8.7 grams of vinyl acetate, 20.3 grams of 1,1-dichloroethylene, and the same amounts of catalysts as in Example 2 was maintained at a temperature of 30° C. under atmospheric pressure for 72 hours. The product was thereafter heated to 110° C. to recover 12.3 grams of unpolymerized materials and to obtain 15.7 grams of a co-polymer as a white porous mass.

This product was submerged in saturated chlorine water for 16 hours, washed thoroughly with water, dried, and reduced to a fine powder. 1 per cent by weight of calcium stearate was incorporated therewith as a heat stabilizer by masticating said stearate and the co-polymeric product together on hot rolls at 120°–140° C. The resulting product molded readily at temperatures between 130° and 155° C. to form articles showing approximately the same resistance to organic solvents, oxidizing agents, acids, etc., as those resins previously described.

*Example 4*

4.35 grams of vinyl acetate, 24.65 grams of 1,1-dichloroethylene, 1.0 gram of methyl stearate (a heat stabilizing agent), 0.1 gram of nickel carbonyl, and 0.1 gram of tetra-ethyl lead were mixed together, charged into a closed glass container, and maintained at a temperature of 40° C. under atmospheric pressure for 48 hours. 4.9 grams of unpolymerized material were recovered therefrom, leaving 24.1 grams of the desired co-polymer as a residue in the form of a hard, slightly porous mass. This material, without washing, was molded directly at temperatures of 130° to 155° C. to obtain products completely insoluble in organic solvents at room temperature, having a high degree of resistance to thermal decomposition, and high tensile strength.

*Example 5*

A mixture of 8 grams of vinyl acetate, 25 grams of 1,1-chloro-bromo-ethylene, and 0.4 gram of a catalytic mixture comprising benzoyl peroxide, tetra-ethyl lead, nickel carbonyl, and chloroacetyl chloride was warmed to and maintained at a temperature of 40° C. at atmospheric pressure for a period of 216 hours. The reaction product was then warmed to 110° C., thereby distilling off 23 grams of unpolymerized material and leaving as a residue 10 grams of the desired co-polymer in the form of a white powder. This material molded readily at temperatures ranging from 150° to 170° C., was unaffected by contact with organic solvents, oxidizing and reducing agents, etc.

While the above examples show the preparation of co-polymers from vinyl acetate and vinyl chloride, other vinyl esters, for example, vinyl bromide, vinyl chloro-acetate, etc., may be substituted therefor to produce equally valuable products.

Where the temperature of reaction is below the boiling point of the reaction mixture, superatmospheric pressure need not be employed in carrying out the reaction. On the other hand it is sometimes desirable that pressures higher than those of the reactants at the temperature of reaction be employed. In such cases the reaction may be carried out, for example, in an inert atmosphere of nitrogen, introduced into the reaction zone under increased pressures either prior to or during the heating process.

In preparing molded articles from my new co-polymers, various fillers such as wood flour, asbestos fibers, cellulose fibers, polymerized dichloroethylene fibers, or any finely divided inert material, may be incorporated in the molding mixture if desired. Such incorporation may be conveniently accomplished by mixing the finely divided inert material with the powdered co-polymer in the die, by rolling the filler with the co-polymer on masticating rolls, or, if desired, by incorporating the filler with the reaction mixture prior to the co-polymerization reaction.

My new co-polymers and the resinous bodies prepared therefrom have, among others, the following advantages: (1) they are substantially unaffected by organic solvents, most acids, bases, and oxidizing agents, (2) they have in their stretched, e. g., drawn and extruded, form a tensile strength in excess of 20,000 pounds per square inch and are very tough and resistant to fracture, (3) they have low molding and softening temperatures well below their thermal decomposition temperatures, (4) they are internally plasticized, due to their co-polymeric structure, (5) they are compatible with many of the common plasticizing and heat stabilizing agents, (6) they exhibit a desirable degree of plasticity at their molding temperatures, (7) they may be molded, drawn, and extruded at relatively low pressures to form valuable plastic articles, filaments, threads, etc., which retain the characteristics of high tensile strength, toughness, and resistance to solvent action shown by the parent product, and (8) they are obtained in a variety of useful forms. The disclosed process economically produces the above-described improved product under moderate conditions of temperature and pressure.

Other modes of applying the principle of my invention may be employed instead of those explained, change being made as regards the materials employed, provided the step or steps or the products recited in the following claims be thereby carried out or obtained.

I therefore particularly point out and distinctly claim as my invention:

1. In a process for preparing a plastic, the step which consists in reacting a compound selected from the group consisting of 1,1-dichloroethylene and 1-chloro-1-bromo-ethylene, with not more than an equal amount of a vinyl ester to produce polymeric bodies containing between about 5 and about 30 per cent by weight of the vinyl ester co-polymerized with said dihalo-ethylenes.

2. In a process for preparing a plastic, the step which consists in reacting 1,1-dichloroethylene with not more than an equal amount of a vinyl ester to produce polymeric bodies containing between about 5 and about 30 per cent by weight of the vinyl ester co-polymerized with said 1,1-dichloroethylene.

3. In a process for preparing a plastic, the step which consists in reacting 1-chloro-1-bromo-ethylene with not more than an equal amount of a vinyl ester to produce polymeric bodies containing between about 5 and about 30 per cent by weight of the vinyl ester co-polymerized with said 1-chloro-1-bromo-ethylene.

4. In a process for preparing a plastic, the step which consists in reacting 1,1-dichloroethylene with not more than an equal amount of vinyl chloride to produce polymeric bodies containing between about 5 and about 30 per cent by weight of the vinyl chloride co-polymerized with said 1,1-dichloro-ethylene.

5. In a process for preparing a plastic, the step which consists in reacting 1,1-dichloroethylene with not more than an equal amount of vinyl acetate to produce polymeric bodies containing between about 5 and about 30 per cent by weight of the vinyl acetate co-polymerized with said 1,1-dichloroethylene.

6. In a process for preparing a plastic, the step which consists in reacting 1-chloro-1-bromo-ethylene with not more than an equal amount of vinyl acetate to produce polymeric bodies containing between about 5 and about 30 per cent by weight of the vinyl acetate co-polymerized with said 1-chloro-1-bromo-ethylene.

7. In a process for preparing plastic bodies the step which consists in warming a 1,1-dichloro-ethylene solution containing between about 5 and about 100 parts by weight of a vinyl ester for each 100 parts of 1,1-dichloroethylene to a temperature between 15° and 60° C., and in the presence of suitable polymerization catalysts, to produce polymeric bodies containing between about 5 and about 30 per cent by weight of the vinyl ester co-polymerized with said 1,1-dichloroethylene.

8. In a process for preparing plastic bodies the step which consists in warming a solution containing a compound selected from the group consisting of 1,1-dichloroethylene and 1-chloro-1-bromo-ethylene, and between about 5 and about 100 parts by weight of a vinyl ester for each 100 parts of said 1,1-dihalo-ethylene to a temperature between 15° and 60° C., and in the presence of suitable polymerization catalysts, to produce polymeric bodies containing between about 5 and about 30 per cent by weight of the vinyl ester co-polymerized with said 1,1-dihalo-ethylenes.

9. In a process for preparing plastic bodies the steps which consist in warming a 1,1-dichloro-ethylene solution containing between about 5 and about 100 parts by weight of a vinyl ester for each 100 parts of 1,1-dichloroethylene to a temperature between 15° and 60° C., and in the presence of suitable polymerization catalysts, to produce polymeric bodies containing between about 5 and about 30 per cent by weight of the vinyl ester co-polymerized with said 1,1-dichloroethylene, and thereafter distilling off unpolymerized chloro-hydrocarbons from the reacted mixture.

10. A polymeric product containing between about 5 and about 30 per cent by weight of a vinyl ester co-polymerized with a compound selected from the group consisting of 1,1-dichloroethylene and 1-chloro-1-bromo-ethylene.

11. A polymeric product containing between about 5 and about 30 per cent by weight of a vinyl ester co-polymerized with 1,1-dichloroethylene.

12. A polymeric product containing between about 5 and about 30 per cent by weight of a vinyl ester co-polymerized with 1-chloro-1-bromo-ethylene.

13. A polymeric product containing between about 5 and about 30 per cent by weight of vinyl chloride co-polymerized with 1,1-dichloroethylene.

14. A polymeric product containing between about 5 and about 30 per cent by weight of vinyl acetate co-polymerized with 1,1-dichloroethylene.

15. A polymeric product containing between about 5 and about 30 per cent by weight of vinyl acetate co-polymerized with 1-chloro-1-bromo-ethylene.

RALPH M. WILEY.